United States Patent [19]

Watson

[11] 4,217,229

[45] * Aug. 12, 1980

[54] OIL WELL SPACER FLUIDS

[75] Inventor: Jimmie L. Watson, Duncan, Okla.

[73] Assignee: Halliburton Company, Duncan, Okla.

[*] Notice: The portion of the term of this patent subsequent to Feb. 20, 1996, has been disclaimed.

[21] Appl. No.: 901,385

[22] Filed: May 1, 1978

Related U.S. Application Data

[62] Division of Ser. No. 725,068, Sep. 20, 1976, Pat. No. 4,141,843.

[51] Int. Cl.$^2$ .............................................. E21B 43/00
[52] U.S. Cl. ........................... 252/8.55 R; 166/244 R; 166/291
[58] Field of Search .............. 252/8.5 A, 8.5 C, 8.5 P, 252/8.55 R; 166/291

[56] References Cited

U.S. PATENT DOCUMENTS

| | | | |
|---|---|---|---|
| 3,753,903 | 8/1973 | Fischer et al. | 252/8.5 |
| 3,849,316 | 11/1974 | Motley et al. | 252/8.55 |
| 3,850,248 | 11/1974 | Carney | 252/8.5 X |
| 3,852,201 | 12/1974 | Jackson | 252/8.5 |
| 3,878,895 | 4/1975 | Wieland et al. | 166/291 X |
| 3,898,165 | 8/1975 | Ely et al. | 252/8.55 |
| 3,986,979 | 10/1976 | Moorer et al. | 252/353 |
| 3,993,570 | 11/1976 | Jackson et al. | 252/8.5 |
| 4,141,843 | 2/1979 | Watson | 252/8.55 |

Primary Examiner—Herbert B. Guynn
Attorney, Agent, or Firm—Robert S. Nisbett; John H. Tregoning

[57] ABSTRACT

A high stability, nondamaging spacer fluid is provided containing readily available weighting agents such as calcium carbonate and iron carbonate dispersed in water using a polymer viscosifier, a salt inhibitor, a primary sulfonated dispersant and a secondary fatty acid amide dispersion. Conventional high density weighting agents can also be used. The spacer fluid is stable over a temperature range of about 32°–300° F. for extended periods with densities ranging from 11 to 17.6 pounds per gallon.

3 Claims, No Drawings

OIL WELL SPACER FLUIDS

This is a division of application Ser. No. 725,068, filed Sept. 20, 1976, now U.S. Pat. No. 4,141,843.

Fluids that were previously used as completion fluids, ballast fluids or packer fluids were expensive or were not stable at elevated temperatures. They would thin or decrease in viscosity and gel strength with time and/or temperature to permit settling of solids. They had insufficient fluid loss control, could only be weighted to about 13.6 pounds per gallon (ppg) without using a formation damaging material, were too corrosive or had a tendency to solidify. Typical applications are described in U.S. Pat. Nos. 2,805,722; 3,254,714 and 3,378,070.

The high stability fluid of this invention, referred to herein as "HYDROWATE," is a water base fluid for use as a ballast, spacer, packer, workover, completion, drilling or perforation fluid, or in conjunction with gravel packing. Its design is such that many of the undesirable properties of previously used fluids have been eliminated. It is composed of water (i.e. fresh or brines), dispersants (optional in some cases), a polymer or viscosifier, a weighting agent such as calcium carbonate and/or iron carbonate (which are acid soluble materials) for weight or density, and an inhibitor such as potassium chloride, 3% by weight of water, for inhibition to prevent damage from the filtrate to water sensitive formations.

The high stability fluid of this invention can be used over a broad temperature range from freezing temperatures up to about 300° F. under appropriate pressure for extended periods. It can be used as ballast to furnish a total weight, as a weighting fluid to supply a minimum or preselected hydrostatic head with a density of about 11 to 17.6 pounds per gallon (ppg) or as a relatively inert, relatively incompressible spacer fluid to separate or move other fluids or maintain pressures on surfaces or formations under either static or dynamic conditions either during chemical or mechanical operations such as drilling or between operations.

The slurry weight of HYDROWATE can be increased to 16 ppg using calcium carbonate weighting agent as shown in Table 1 and to 17.6 ppg using a combination of calcium carbonate and iron carbonate weighting agent; these materials are acid soluble. Viscosity, yield point, and gel strength can be controlled within limits by either varying the amount and type of dispersant used or by varying the amount of viscosifier (as shown in Tables 4 and 5). The viscosifier, along with the weighting materials, impart good fluid loss control and provide sufficient gel strength to keep the weighting materials suspended under static conditions at temperatures up to 290° F. After remaining static at 250° F. for 60 days, there is no settling of particles in the HYDROWATE at densities or weights of 12 and 16 ppg. Also, no settling of particles occurs in a 17.0 ppg HYDROWATE after remaining static at 290° F. for 60 days. Each of these fluids can be pumped or agitated very easily, with no tendency to solidify.

Viscosity and yield point are reduced by temperature increase but not to the point of permitting settling. This reduction in viscosity should facilitate placement, and the yield point reduction will make displacement easier to achieve. Tables 1, 2 and 3 show the recipes of typical slurries from 11 to 17.6 ppg and the fluid properties of these slurries at 72°, 150° and 160° F.

Gas entrainment, as a result of reacting acid with HYDROWATE or bubbling nitrogen through the fluid, is not a problem according to laboratory test results. The gas resulting from the reaction of hydrochloric acid and calcium carbonate dissipate readily out of the fluid. Nitrogen was bubbled through HYDROWATE until it was gas cut 7%, i.e. had a 7% increase in volume or decrease in density. The addition of a defoamer to de-gas the fluid readily and continued bubbling of gas through treated fluid does not result in gas re-entrainment. A vacuum degasser is also effective in removing entrained gas or air.

Since all solids used in the preparation of HYDROWATE are substantially acid soluble, the solids can be removed readily should they penetrate the formation. The use of potassium chloride in the fluid for inhibition and low fluid loss should keep formation damage to a minimum. Flow tests through a sandstone core showed no reduction in the backflow of crude oil after HYDROWATE had been against the core face under pressure at 100 psi and 150° F. When the core was flushed with 15% hydrochloric acid following the exposure to HYDROWATE, an increase in flow rate of the crude oil was observed as shown in Table 7.

To determine the compatibility of HYDROWATE with other fluids, it was mixed with various fluids and the VG Meter readings taken of mixtures. The VG Meter is described in U.S. Pat. Nos. 2,703,006; 3,057,421; 3,327,825 and 3,435,666. The tests were run according to API Method 10B. The viscosity of HYDROWATE was reduced in each case when diluted up to 50% by volume with a bentonite mud slurry, a neat cement slurry and a gelled aqueous fluid. The results are shown in the following table.

| Contaminant | Mud | | | | Cement | | | Gelled Aqueous Fluid | | |
|---|---|---|---|---|---|---|---|---|---|---|
| Percent | 0 | 20 | 30 | 50 | 20 | 30 | 50 | 20 | 30 | 50 |
| 100 rpm Reading | 275 | 158 | 92 | 153 | 108 | 73 | 50 | 157 | 137 | 127 |

Due to the presence of a viscosifier which is used for dispersing the weighting agents and reducing fluid loss, the pressure losses or flowing frictional pressures of HYDROWATE are higher than for non-solids fluids. Reasonable rates of flow for placement and displacement, however, can be achieved. Flow rate and frictional pressure losses can be readily determined on HYDROWATE for specific conditions in view of this disclosure.

A preferred class of viscosifiers for the high stability fluid of this invention is the water soluble polysaccharides and especially the substituted nonionic cellulose polymers, such as hydroxy alkyl cellulose or cellulose ethers in which the hydroxy alkyl groups have 2–3 carbon atoms. Other substituents can be present or used which produce a water soluble cellulose which does not adversely react in the high density fluid system. The substituted cellulose should be hydratable in the high density fluid. The preferred cellulose class can be represented as a series of anhydroglucose units shown as follows:

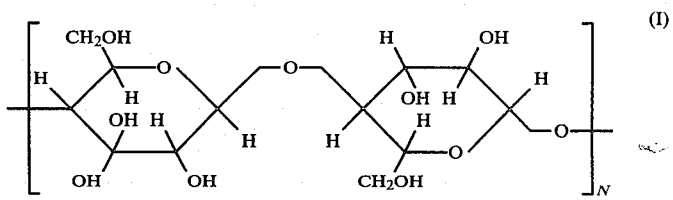

The portion in brackets is two anhydroglucose units, each having three reactive hydroxyl groups. N is an integer which would give the desired polymer molecule length and preferably an aqueous viscosity of about 105–130 viscosity units of consistency at 72° F. (approximately equal to centipoise [cp]) on a V.G. Meter at 300 RPM with a 2.5% aqueous solution in fresh water.

When the cellulose polymer is treated with sodium hydroxide and reacted with ethylene oxide, an ether substituted cellulose such as hydroxyethyl ether or hydroxyethylcellulose is produced shown as follows:

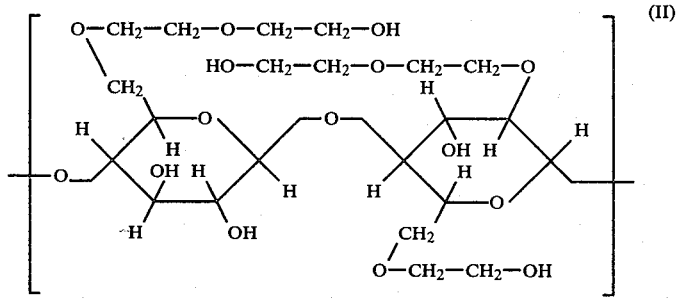

The hydroxyethylcellulose or HEC shown has three of the six hydroxyl groups substituted by ethylene oxide; therefore the degree of substitution (or D.S.) is 3 of 6 or 1.5 per anhydroglucose unit. The preferred D.S. for cellulose polymer viscosifiers of this invention is about 1.0–3.0.

The above formula also shows that two of the substituted hydroxyl groups have two moles of ethylene oxide and one has one mole of ethylene oxide; therefore, the ratio of moles of ethylene oxide to anhydroglucose unit (or M.S.) ratio is 5 moles for two units or 2.5. The preferred M.S. ratio for HEC polymer viscosifiers of this invention is 1.5–3.0.

Thus, the preferred class of cellulose ether polymers can have various polymer lengths, degrees of substitution and lengths of side chains. Since these factors are interrelated the preferred polymers can be readily defined by viscosity in aqueous solutions. Brookfield viscosity in centipoises of preferred types of HEC are given in Table 10.

The viscosity measurement and sample preparation must be carefully controlled. The viscosity measurement must be standardized because the viscosity reading is dependent upon rate of shear, temperature, amount of agitation prior to measurement and elapsed time between agitation and measurement. The sample must be completely dissolved and a moisture correction included. Samples are dried by heating in a correction oven at a constant temperature of about 105°±0.5° C. for 3 hours. The samples are cooled in a desiccator and weighed at ambient temperature. The heating for about 45 minutes and cooling are repeated until repreated weights are within about 5 milligrams per each 5 grams of sample. The amount of moisture in the samples is used to calculate solution concentration of remaining portions of the cellulose polymer. The polymer solution and samples for moisture determination should be prepared at the same time to insure correspondence between the moisture correction and samples used for solution preparation. An estimated amount of polymer to prepare the desired concentration and amount of polymer solution should be weighed and stored in a moisture tight container. After the moisture correction factor is applied and the exact amount of water required is determined, the water and polymer should be carefully mixed with slow agitation. After the polymer appears to be completely dissolved, the solution should be vigorously agitated for 10–15 minutes. For viscosity measurement the solution should be at a constant temperature of 25°±0.5° C. for at least 30 minutes but the viscosity must be measured within two hours of the vigorous agitation, or the solution should be vigorously re-agitated for ten minutes and held at a constant 25° C. for 30 minutes before measurement.

Dispersants used for compositions of this invention are of two principal types. Either or both types of dispersants can be used over the full density range, but the primary dispersant which is referred to as sulfonate dispersant is preferably used for density up to about 16 pounds per gallon. For higher density fluids where more than one type of weighting agent and/or high loading of weighting agent is used, the secondary dispersant which is referred to as oleyl amide dispersant is used. Generally, less than about 0.4% by weight (i.e., 2.5 pounds per 42-gallon barrel [ppg]) of primary dispersant and less than about 0.45% by weight or 3 ppb of secondary dispersant is used in the high stability fluid of this invention. For low densities (e.g., 12 ppg) and under certain conditions the dispersant can be considered optional, but generally it is used for easier mixing and to improve suspension characteristics of the aqueous base fluid which may be water or brine. The maximum concentration of dispersant is usually determined by economics and the density desired, but is preferably less than about 1.5% by weight of resulting fluid.

The preferred class of primary dispersants is the product of a low molecular weight aldehyde and a naphthalene sulfonate salt. A preferred sulfonate dispersant combined with polyvinylpyrrolidone (i.e., PVP) is described in U.S. Pat. No. 3,359,225 which is incorporated herein by reference. Up to 10% PVP can be used with the naphthalene sulfonate and can be in the form of an alkali or alkaline metal salt, but preferably is a sodium or potassium salt. Other conventional dispersants such as lignosulfonates, sulfonated lignites, gluconic acid, delta lactone and lignin liquor can be used alone in some cases and in combination with a primary sulfonate dispersant.

A preferred class of secondary dispersants are fatty acid amides produced by the reaction of saturated or unsaturated fatty acid halides having about 14-18 carbon atoms per molecule with a low molecular weight amino sulfonic acid having about 1-6 carbon atoms. The sulfonic acid can have alkyl and/or aryl radicals having 1-6 carbon atoms and one or more sulfonic acid groups or salts thereof. A preferred amide is the reaction product of oleyl chloride and a $C_3$ sulfonic acid or sodium salt, N-methyl taurate. This preferred oleyl amide is also mixed with approximately 25-75% by weight, but preferably equal amounts, of lignin liquor. This lignin liquor is a waste product of the sulfite process or the Kraft process used in the wood pulping industry. This lignin is sulfonated with a sulfur content of preferably about 1-3% by weight. Other fatty acids which can be used are linoleic, linolenic, stearic, palmitic, myristic, myristoleic and mixtures of fatty acids. The amide dispersant can be used as a liquid or adsorbed on a relatively inert particulate carrier such as diatomaceous earth.

The water or aqueous base used to prepare the high stability fluid of this invention can be fresh water or brine containing one or more salts up to saturation. As shown herein, fresh water is preferred as the base material because it is easier to mix the ingredients if a particular order is used. A salt or inhibitor is usually added as the last component where possible. The salt serves to inhibit clays which may be encountered. The polymer viscosifier also acts as an inhibitor. Alkali metals, alkaline earth metals and ammonium salts are preferred cations of the salt, especially sodium, magnesium, potassium, and/or calcium halides such as chlorides, bromides or combinations thereof. The salt concentration should be about 0.5-15% by weight, and preferably about 1-6% by weight.

The weighting agents used for compositions of this invention are relatively inert finely divided particulate materials having a particle size with at least 80% by weight between about 2-50 microns ($\mu$). Preferably, all or at least 90% of the material will pass through a 200-mesh U.S. Standard Sieve Screen. The particulate weighting agent should also have a specific gravity of at least 2.4 and preferably about 2.5-3.8. A preferred class of weighting agents are considered acid soluble in aqueous acids such as acetic, hydrochloric, nitric, sulfurous, sulfuric and phosphoric. This class includes calcium carbonate, iron carbonate and the iron oxides. Higher specific gravity weighting agents having a specific gravity of 4.0-7.0 such as barium sulfate and lead sulfite can be used in combination with the acid soluble weighting agents. The acid soluble weighting agents preferably have a particle size distribution so that at least 80% is between 2-20 microns in size with a mean size of about 4-10 microns. The high specific gravity weighting agents preferably have a particle size distribution so that at least 80% is between 2-50 microns with a mean size of about 15-20 microns. High concentrations of very small particles tend to increase viscosity of the resulting composition while larger particles tend to settle faster. The higher specific gravity weighting agents are not considered acid soluble for condition of use but since the high stability fluid of this invention does not invade most formations, it is considered nondamaging even with the higher specific gravity materials. The particular weighting agents and particle size distribution affect fluid loss. The viscosity and API fluid loss are determined by standard API methods such as described by API Method 10B using a direct reading rotational viscometer often referred to a VG Meter or Fann VG Meter and described in U.S. Pat. Nos. 2,703,006; 3,327,825; 3,435,666 and 3,057,421. Using the VG Meter, the viscosity of the high stability fluid of this invention should have a minimum value of at least about 49 viscosity units at 72° F. for 16 pounds per gallon density fluid. The maximum viscosity can be above 300 units for high weight fluids, depending upon limitations of the agitation and pumping equipment being used. The viscosity reading of the VG Meter is reported in viscosity units or units of consistency which approximately correspond to centipoises (cp) but is not an exact relationship since the fluids are non-Newtonian in character. The fluids can be readily weighted up to 16 ppg with one or more of the acid soluble weighting agents such calcium carbonate to form a high stability nondamaging fluid. Densities of up to about 17.6 ppg can be obtained by using agents in combination such as calcium carbonate and iron carbonate. These densities easily exceed the limitation of previously known systems which was about 13.6 ppg. Low density high stability fluids can be obtained by using low density particulate materials, in which case the amount of viscosifier may be reduced. Higher densities are obtained by increasing the amount of higher density particulate materials. The dispersants and weighting materials are preferably combined stepwise in order of increasing densities and dispersing power. For most applications, the fluid loss of the high stability fluid should be 8.0 or less and preferably less than about 5 milliliters per 30 minutes at 72° F. The preferred concentrations of acid soluble weighting agents is about 32-78% by weight of fluid or 150-512 ppb. The preferred concentrations of high density weighting agents is less than 30-65% by weight or 140-425 ppb.

EXAMPLES

Procedures for preparing the high density, high stability, nondamaging aqueous HYDROWATE fluid of this invention with properties of numerous samples are given herein. These examples, procedures and data will enable one skilled in the art to practice the invention with many obvious variations. Fluids can be prepared and modified in view of this disclosure. Tables 1-10 illustrate the ranges and concentrations of various components. Parts, percentages, and proportions are by weight unless indicated otherwise. The abbreviations ppg and ppb refer to pounds per gallon of fluid and pounds per 42-gallon barrel of fluid. All references cited herein are incorporated herein to any extent necessary.

SAMPLE PREPARATION PROCEDURE

Samples for the data in the tables set forth herein were prepared by mixing with moderate to vigorous agitation in a blender and adding ingredients slowly and uniformly in the order given as follows:

1. The required amount of tap water was placed in the blender at ambient condition;
2. With moderate agitation the required amount of sulfonate or primary dispersant was blended into the water and agitated for an additional minute;
3. With moderate agitation calcium carbonate weighting agent or primary weighting agent was blended into the water with additional mixing for two minutes;
4. With moderate to vigorous agitation HEC (hydroxyethylcellulose) viscosifier was blended into the water or aqueous slurry with additional agitation for ten minutes; secondary dispersant such as oleyl amide dispersant and secondary weighting agent such as iron carbonate or tertiary weighting agent such as galina or barium sulfate would be added at this point for densities above about 16.0 ppg; and
5. While mixing, inhibitor salt such as potassium chloride, sodium chloride or calcium chloride is added. Agitation is continued for about three minutes.

Samples are tested according to API Methods such as 10B. Viscosity measurements are taken from a direct reading viscometer such as a Model 35 Fann VG Meter using a No. 2 spring and the values indicated on the meter are doubled and recorded in the tables. Fluid loss and other values are measured by standard methods. The apparent viscosity is in units of consistency or approximately equal to centipoises and is calculated as one half of the reading at 600 RPM. Plastic viscosity is calculated as the difference between the 600 RPM and 300 RPM readings. Plastic viscosity is an indicator of the solids content of the fluid. Yield point is calculated as the difference between twice the 300 RPM reading and the 600 RPM reading. It is an indicator of the attraction between particles in the fluid in pounds per 100 square feet.

MIXING INSTRUCTIONS

For convenience and ease of preparation, HYDROWATE is preferably mixed at a location having good measuring and mixing facilities and then delivered to any remote location for use such as a well site. Storage tanks should be clean and, although settling of weight material is not anticipated during storage, should include some means of periodic agitation. The storage and mixing system should be thoroughly cleaned and inspected before and after storing the weighting agent such as calcium carbonate. Any air used for mixing or conveying should be dry.

HYDROWATE fluid is preferably mixed in a turbine blender, but can be mixed successfully using a jet mixer or ribbon blender. Typical mixing equipment is shown in U.S. Pat. Nos. 2,884,230; 3,237,805; 3,251,583; 3,463,460; 3,512,841; 3,563,517; and 3,844,351.

When using a ribbon blender, sufficient agitation to "pull" the viscosifier into the fluid is necessary or it will water wet, forming balls of polymer that will not easily disperse.

The order of addition for weights through 16.0 ppg is as follows: water, sulfonate dispersant, weighting agent, viscosifier and inhibitor, such as potassium chloride. The order of addition for weights from 16.0 through 17.6 ppg are as follows: water, sulfonate dispersant, weighting agent, oleyl amide dispersant, high density weighting agent such as iron carbonate, viscosifier and inhibitor. The oleyl amide dispersant and iron carbonate can be added together to minimize foaming or a defoaming additive can be used.

PREPARATION METHOD I USING A TURBINE BLENDER

1. Measure the required amount of water into one side of the turbine blender.
2. Continue mixing and add the required amount of sulfonate dispersant.
3. Continue mixing and add the required amount of weighting material.
4. Continue mixing and add together any additionally required amount of oleyl amide dispersant for the required density and additionally high density weighting agent such as iron carbonate.
5. Continue mixing and circulating and add the required amount of viscosifier through the hopper.
6. Continue mixing and add the required amount of inhibitor such as potassium chloride at about 10.5 ppb.
7. Continue the slurry movement and blending until desired properties are reached.

PREPARATION METHOD II USING A JET MIXER

1. Measure the required amount of water in a clean vessel.
2. While circulating, add the required amount of sulfonate dispersant.
3. Continue circulating and slowly add the required amount of weighting material such as calcium carbonate.
4. Continue circulation and slowly add the required amount of viscosifier.
5. Continue circulation and add inhibitor such as potassium chloride.
6. Continue the slurry agitation until desired properties are reached.
7. Oleyl amide dispersant can be added if lower viscosity is desired.

PREPARATION METHOD III USING A RIBBON BLENDER

1. Measure amount of water required into a clean ribbon blender vessel.
2. Add sufficient acid such as 15% hydrochloric acid to lower the pH to below 6.5*. This requires approximately 0.3 to 0.8 gallons per barrel depending on the weight to be mixed.

* Lowering the pH permits the viscosifier to disperse more evenly and to do so with much less energy or shear than normal. This also retards hydration of the viscofier, keeping the viscosity minimal, which facilitates easier blending.

3. While agitating the fluid, add the necessary amount of sulfonate dispersant.
4. Continue agitation and slowly add the required amount of weighting material, e.g. calcium carbonate.
5. Continue agitation and slowly add the correct amount of viscosifier.
6. Continue agitation and add inhibitor such as potassium chloride at about 10.5 ppb.
7. Continue agitation and add sufficient 20% caustic solution (preferably NaOH or KOH) to raise the pH to about 7.5–11.5 or back to normal.** This requires approximately 0.10 gallons per barrel, depending on the density to be mixed.

** When the pH is raised to normal, hydration of the viscosifier proceeds and the desired viscosity is then achieved.

Should the viscosity be less than that desired or should more stability, fluid loss control, etc., be needed to adapt the HYDROWATE for a packer fluid, the pH can again be lowered in order that more viscosifier may be added more easily. The adjustment of the pH to normal again will result in the hydration of the viscosifier to produce the desired viscosity increase. No difference in HYDROWATE properties resulted when the pH was raised to 7.5 and to 11.5 showing that the final pH is not critical as long as it is above about 7.5.

Should weight adjustment be desired, the necessary amounts of water or weighting agent can be readily determined in view of this disclosure.

Table 1

| | Weight Pounds Per Gallon (ppg) | | | | | | | | | | | |
|---|---|---|---|---|---|---|---|---|---|---|---|---|
| | 11.0 | 11.5 | 12.0 | 12.5 | 13.0 | 13.5 | 14.0 | 14.5 | 15.0 | 15.5* | 16.0* | 16.0** |
| Fresh Water (gal) | 34.1 | 32.5 | 31.1 | 29.6 | 28.1 | 26.6 | 25.2 | 23.8 | 22.2 | 20.8 | 19.2 | 19.2 |
| Sulfonate Dispersant (ppb) | 0 | 0 | 0 | 0.2 | 0.2 | 0.5 | 0.5 | 2.0 | 2.0 | 2.5 | 2.5 | 2.5 |
| Weighting Agent, CaCO$_3$ (ppb) | 178 | 212 | 245 | 278 | 312 | 345 | 378 | 412 | 445 | 478 | 512 | 512 |
| Viscosifier, HEC (ppb) | 7 | 6.5 | 5 | 5 | 4 | 3.5 | 3 | 1.5 | 1.25 | 1.0 | 0.5 | 0.5 |
| Inhibitor, KCl (ppb) | 10.5 | 10.5 | 10.5 | 10.5 | 10.5 | 10.5 | 10.5 | 10.5 | 10.5 | 10.5 | 10.5 | 10.5 |
| | Initial Rheology at 72° F. | | | | | | | | | | | |
| Apparent Viscosity | 212 | 230 | 157 | 211 | 186 | 180 | 200 | 120 | 176 | 164 | 300+ | 113 |
| 600 Reading | 424 | 460 | 314 | 422 | 372 | 360 | 400 | 240 | 352 | 328 | 600+ | 226 |
| 300 Reading | 272 | 292 | 192 | 260 | 230 | 216 | 234 | 134 | 200 | 174 | 430 | 118 |
| Plastic Viscosity | 152 | 168 | 122 | 162 | 142 | 144 | 166 | 106 | 152 | 154 | — | 108 |
| Yield Point | 120 | 124 | 70 | 98 | 88 | 72 | 68 | 28 | 48 | 20 | — | 10 |
| 200 Reading | 208 | 224 | 143 | 192 | 170 | 156 | 172 | 96 | 144 | 120 | 396 | 80 |
| 100 Reading | 126 | 134 | 86 | 112 | 100 | 90 | 100 | 54 | 82 | 70 | 170 | 46 |
| 6 Reading | 14 | 16 | 12 | 12 | 12 | 10 | 14 | 10 | 16 | 24 | 40 | 18 |
| 3 Reading | 8 | 10 | 8 | 8 | 8 | 7 | 10 | 8 | 14 | 22 | 30 | 16 |
| Gel Strength (10 sec) | 10 | 10 | 8 | 10 | 10 | 8 | 16 | 12 | 22 | 32 | 34 | 24 |
| Gel Strength (10 min) | 12 | 10 | 12 | 14 | 16 | 20 | 30 | 22 | 42 | 42 | 52 | 34 |
| pH | 8.45 | 8.20 | 8.25 | 8.20 | 81.0 | 8.20 | 8.25 | 8.1 | 8.1 | 8.1 | 8.1 | 8.1 |
| API Fluid Loss (mls/30 mn) | 4.3 | 4.0 | 5.4 | 4.7 | 5.5 | 5.2 | 3.8 | 5.7 | 5.3 | 7.4 | 5.1 | |

*0.5 pounds per barrel oleyl amide dispersant referred to as SPACER SPERSE.
**1.0 pounds per barrel SPACER SPERSE.
Note: ppb-pounds per 42 gallon barrel.

TABLE 2

| | Weight, Pounds Per Gallon | | | | | | | | | | | |
|---|---|---|---|---|---|---|---|---|---|---|---|---|
| | 11.0 | 11.5 | 12.0 | 12.5 | 13.0 | 13.5 | 14.0 | 14.5 | 15.0 | 15.5* | 16.0* | 16.0** |
| Fresh Water (gal) | 34.1 | 32.5 | 31.1 | 29.6 | 28.1 | 26.6 | 25.2 | 23.8 | 22.2 | 20.8 | 19.2 | 19.2 |
| Sulfonate Dispersant (ppb) | 0 | 0 | 0 | 0.2 | 0.2 | 0.5 | 0.5 | 2.0 | 2.0 | 2.5 | 2.5 | 2.5 |
| Weighting Agent, CaCO$_3$ (ppb) | 178 | 212 | 245 | 278 | 312 | 345 | 378 | 412 | 478 | 512 | 512 | |
| Viscosifier, HEC (ppb) | 7 | 6.5 | 5 | 5 | 4 | 3.5 | 3 | 1.5 | 1.25 | 1.0 | 0.5 | 0.5 |
| Inhibitor, KCl (ppb) | 10.5 | 10.5 | 10.5 | 10.5 | 10.5 | 10.5 | 10.5 | 10.5 | 10.5 | 10.5 | 10.5 | 10.5 |
| | Initial Rheology at 160° F. | | | | | | | | | | | |
| Apparent Viscosity | 78 | 80 | 61 | 71 | 69 | 60 | 66 | 104 | 57 | 63 | 110 | 49 |
| 600 Reading | 156 | 160 | 122 | 142 | 138 | 120 | 132 | 208 | 114 | 126 | 220 | 98 |
| 300 Reading | 92 | 92 | 72 | 80 | 80 | 70 | 78 | 116 | 66 | 74 | 120 | 54 |
| Plastic Viscosity | 64 | 68 | 50 | 62 | 58 | 50 | 54 | 92 | 48 | 52 | 100 | 44 |
| Yield Point | 28 | 24 | 22 | 18 | 22 | 20 | 24 | 24 | 18 | 22 | 20 | 10 |
| 200 Reading | 62 | 66 | 52 | 58 | 60 | 50 | 58 | 82 | 48 | 26 | 84 | 42 |
| 100 Reading | 36 | 38 | 32 | 32 | 34 | 30 | 36 | 50 | 30 | 22 | 52 | 28 |
| 6 Reading | 4 | 6 | 6 | 6 | 8 | 6 | 10 | 14 | 12 | 24 | 18 | 16 |
| 3 Reading | 6 | 4 | 5 | 4 | 6 | 5 | 8 | 12 | 10 | 22 | 16 | 15 |
| Gel Strength (10 sec) | 6 | 6 | 8 | 8 | 10 | 8 | 14 | 18 | 16 | 24 | 18 | 18 |
| Gel Strength (10 min) | 6 | 8 | 14 | 10 | 18 | 14 | 16 | 32 | 26 | 34 | 40 | 32 |

*0.5 ppb SPACER SPERSE.
**1.0 ppb SPACER SPERSE.

TABLE 3

| | Weight, Pounds Per Gallon | | | | | |
|---|---|---|---|---|---|---|
| | 16.5 | 17.0 | 17.6 | 16.5 | 17.0 | 17.6 |
| Fresh Water (gal) | 22.58 | 21.92 | 20.64 | 22.72 | 21.96 | 20.64 |
| Sulfonate Dispersant (ppb) | 0.2 | 0.2 | 0.2 | 0.2 | 0.2 | 0.2 |
| Weighting Agent (ppb) | 251 | 243 | 231 | 251 | 243 | 231 |
| Oleyl Amide Dispersant (ppb) | 1.5 | 2.0 | 3.0 | 1.5 | 2.0 | 3.0 |
| Weighting Agent, Iron Carbonate (ppb) | 254 | 285 | 334 | 254 | 285 | 334 |
| Viscosifier, HEC (ppb) | 3.0 | 3.0 | 2.5 | 3.0 | 3.0 | 2.5 |
| Inhibitor, KCl (ppb) | 10.5 | 10.5 | 10.5 | 10.5 | 10.5 | 10.5 |
| | Initial Rheology at 72° F. | | | Initial Rheology at 150° F. | | |
| Apparent Viscosity | 300+ | 300+ | 300+ | 165 | 171 | 200 |
| 600 Reading | 600+ | 600+ | 600+ | 330 | 342 | 400 |
| 300 Readng | 600+ | 600+ | 600+ | 230 | 219 | 230 |
| Plastic Viscosity | — | — | — | 100 | 123 | 170 |
| Yield Point | — | — | — | 130 | 96 | 60 |
| 200 Reading | 474 | 520 | 599 | 208 | 166 | 168 |
| 100 Reading | 306 | 336 | 370 | 160 | 114 | 102 |

TABLE 3-continued

| | | | | | | |
|---|---|---|---|---|---|---|
| 6 Reading | 78 | 80 | 68 | 36 | 44 | 24 |
| 3 Reading | 62 | 64 | 52 | 32 | 40 | 24 |
| Gel Strength (10 sec) | 70 | 72 | 130 | 38 | 50 | 66 |
| Gel Strength (10 min) | 140 | 130 | 250 | 74 | 88 | 134 |
| pH | 8.5 | 8.5 | 8.5 | — | — | — |
| API Fluid Loss (mls/30 min) | 5.0 | 5.5 | 4.9 | — | — | — |
| HT-HP Fluid Loss - 450 psi 250° F. | 3.0 | 24* | 34 | — | — | — |

*Fluid loss at 220° F.

TABLE 4

17 ppg HYDROWATE

21.96 gal. Water
0.2 ppb Sulfonate Dispersant
2.0 ppb Oleyl Amide Dispersant
248 ppb CaCO$_3$ Weighting Agent
285 ppb Iron Carbonate Weighting Agent
    ppb HEC Variable Viscosifier
10.5 ppb KCl Inhibitor

| Viscosifier | 2.0 | | | | 3.0 | |
|---|---|---|---|---|---|---|
| Temperature °F. | 72 | 150 | 175 | 200 | 72 | 150 |
| Apparent Viscosity | 300+ | 150 | 110 | 81 | 300+ | 171 |
| 600 Reading | 600+ | 300 | 220 | 162 | 600+ | 342 |
| 300 Reading | 548 | 176 | 138 | 104 | 600+ | 219 |
| Plastic Viscosity | — | 124 | 82 | 58 | — | 123 |
| Yield Point | — | 52 | 56 | 46 | — | 96 |
| 200 Reading | 442 | 134 | 104 | 82 | 520 | 166 |
| 100 Reading | 270 | 84 | 68 | 56 | 336 | 114 |
| 6 Reading | 62 | 26 | 22 | 20 | 80 | 44 |
| 3 Reading | 52 | 21 | 20 | 18 | 64 | 40 |
| Gel Strength (10 sec.) | 66 | 32 | — | — | 72 | 50 |
| Gel Strength (10 min.) | 118 | 66 | — | — | 130 | 88 |
| API Fluid Loss (mls/30 min.) | 8.6 | — | — | — | 5.5 | — |
| HT-HP Fluid Loss (mls/30 min.) | | | | | | |
| 150° F. | 30 | — | — | — | 16.8 | — |
| 220° F. | — | — | — | — | 24 | — |

TABLE 5

Variation of Rheology With pH
Initial Rheology of 14 ppg HYDROWATE Fluid at 72° F.

| | pH | | | | | | | | |
|---|---|---|---|---|---|---|---|---|---|
| | 6.1 | 7.05 | 8.05 | 8.65 | 9.4 | 9.75 | 10.75 | 11.25 | 12.0 |
| Apparent Viscosity | 201 | 222 | 275 | 280 | 271 | 270 | 253 | 255 | 242 |
| 600 Reading | 402 | 444 | 550 | 560 | 542 | 540 | 506 | 510 | 484 |
| 300 Reading | 238 | 264 | 326 | 334 | 322 | 320 | 300 | 301 | 286 |
| Plastic Viscosity | 164 | 180 | 224 | 226 | 220 | 220 | 206 | 209 | 198 |
| Yield Point | 74 | 84 | 102 | 108 | 102 | 100 | 94 | 92 | 88 |
| 200 Reading | 174 | 192 | 238 | 246 | 236 | 224 | 220 | 220 | 208 |
| 100 Reading | 100 | 110 | 138 | 142 | 136 | 134 | 126 | 126 | 120 |
| 6 Reading | 11 | 12 | 18 | 18 | 16 | 16 | 15 | 16 | 15 |
| 3 Reading | 7 | 8 | 12 | 12 | 10 | 12 | 10 | 10 | 10 |
| Gel Strength (10 sec.) | 8 | 10 | 14 | 16 | 14 | 16 | 14 | 14 | 14 |
| Gel Strength (10 min.) | 14 | 14 | 22 | 22 | 19 | 24 | 20 | 20 | 20 |
| API Fluid Loss (mls/30 min.) | 5.7 | 5.4 | 4.4 | 4.6 | 4.8 | 3.8 | 4.0 | 4.6 | 4.4 |

TABLE 6

One Barrel - 17 ppg HYDROWATE Aging Test

| | |
|---|---|
| Water | 21.96 gal. |
| Sulfonate Dispersant | 0.20 ppb |
| CaCO$_3$ Weighting Agent | 245 ppb |
| Oleyl Amide Dispersant | 2.0 ppb |
| Iron Carbonate Weighting Agent | 285 ppb |
| HEC Viscosifier | 3.0 ppb |
| KCl Inhibitor | 10.5 ppb |

| | First Day | | Third Day | | | | | |
|---|---|---|---|---|---|---|---|---|
| Turbo Blender Tank | Left Tank | Right Tank | Left Tank | | | Right Tank | | |
| Temperature °F. | 72 | 72 | 72 | 150 | 175 | 72 | 150 | 175 |
| Apparent Viscosity (UV) | 300+ | 300+ | 300+ | 185 | 147 | 300+ | 179 | 147 |
| 600 Reading | 600+ | 600+ | 600+ | 370 | 294 | 600+ | 358 | 294 |
| 300 Reading | 462 | 500 | 560 | 246 | 206 | 580 | 238 | 194 |

TABLE 6-continued

One Barrel - 17 ppg
HYDROWATE Aging Test

| | |
|---|---|
| Water | 21.96 gal. |
| Sulfonate Dispersant | 0.20 ppb |
| CaCO$_3$ Weighting Agent | 245 ppb |
| Oleyl Amide Dispersant | 2.0 ppb |
| Iron Carbonate Weighting Agent | 285 ppb |
| HEC Viscosifier | 3.0 ppb |
| KCl Inhibitor | 10.5 ppb |

| | First Day | | Third Day | | | | | |
|---|---|---|---|---|---|---|---|---|
| Turbo Blender Tank | Left Tank | Right Tank | Left Tank | | | Right Tank | | |
| Temperature °F. | 72 | 72 | 72 | 150 | 175 | 72 | 150 | 175 |
| Plastic Viscosity (UV) | — | — | — | 124 | 88 | — | 120 | 100 |
| Yield Point (lbs/100 sq.ft.) | — | — | — | 122 | 118 | — | 118 | 94 |
| 200 Reading | 360 | 390 | 434 | 200 | 170 | 454 | 188 | 154 |
| 100 Reading | 240 | 258 | 284 | 144 | 136 | 296 | 130 | 110 |
| 6 Reading | 70 | 68 | 70 | 64 | 62 | 76 | 52 | 50 |
| 3 Reading | 58 | 58 | 58 | 58 | 58 | 60 | 48 | 42 |
| Gel Strength (10 sec.) (lbs/100 sq. ft.) | — | — | — | 60 | — | — | 50 | — |
| Gel Strength (10 min.) (lbs/100 sq. ft.) | — | — | — | 76 | — | — | 72 | — |
| API Fluid Loss (mls/30 min) | — | — | 5.4 | — | — | 5.3 | — | — |
| HT-HP Fluid Loss (250° F. - 450 psi) (mls/30 min) | — | — | 19.0 | — | — | 18.8 | — | — |
| Weight (ppg) | 17.0 | 17.0 | 17.0 | — | — | 17.0 | — | — |

NOTE:
In the make-up, the oleyl amide dispersant was added along with the iron carbonate to eliminate foaming.
UV = Unit Viscosity

TABLE 7

| Fluid No. | Description |
|---|---|
| A | HYDROWATE (17.0 ppg) aged 18 days |
| B | HYDROWATE contained in storage tank as mixed on 16th day. |
| C | Combination of Fluid A and B after 19th day. |

| Fluid No. | *A | B | C |
|---|---|---|---|
| Temperature °F. | 72 | 72 | 72 |
| Apparent Viscosity (UV) | 300+ | 300+ | 300+ |
| 600 Reading | 600+ | 600+ | 600+ |
| 30 Reading | 526 | 600+ | 510 |
| Plastic Viscosity (UV) | — | — | — |
| Yield Point (lbs/100 sq. ft.) | — | — | — |
| 200 Reading | 416 | 500 | 400 |
| 100 Reading | 280 | 316 | 270 |
| 6 Reading | 78 | 60 | 86 |
| 3 Reading | 70 | 24 | 72 |
| Weight (ppg) | 17.0 | 16.8 | 17.0 |

*Fluid A had set static in storage tanks for 20 days. The fluid was stirred one time during the 20 days. There was no settling of solids and no change in properties.

TABLE 8

HYDROWATE Completion Fluid Formula: Core Tests
Density - 15.0 ppg
One Barrel Make-Up

| | |
|---|---|
| Fresh Water | 22.2 gal. |
| Sulfonate Dispersant | 0.5 ppb |
| CaCO$_3$ Weighting Agent | 445 ppb |
| HEC Viscosifier | 2.0 ppb |
| KCl Inhibitor | 10.5 ppb |

Test A

Step 1—Morrow crude flowed through Berea core. Flow Rate=100 cc/10 min. (10 cc/min.) at 100 psi and 150° F.

Step 2—Core backflowed with HYDROWATE completion fluid. Flow Rate=2½ cc/10 min. (0.25 cc/min.)

Step 3—Morrow crude flowed through Berea core same direction as Step 1. Flow Rate=100 cc/9 min. (11.1 cc/min.).

Test B

Step 1—Morrow crude flowed through Berea core. Flow Rate=198 cc/17 min. (11.65 cc/min.)

Step 2—Core backflowed with HYDROWATE completion fluid. Flow Rate=1 cc/30 min.

Step 3—Core lightly rinsed with water to remove all fluid except filter cake. 15% HCl acid was allowed to remain static on cake for 20 min. Next, the 15% HCl acid was flowed through core in same direction as Step 2. Flow rate=218 cc/13 min. (16.77 cc/min.).

Step 4—Morrow crude was flowed through Berea core in same direction as Step 1. Flow Rate=199 cc/6½ min. (30.6 cc/min.).

Test C

Step 1—Morrow crude flowed through Berea core. Flow Rate=157 cc/30 min. (5.23 cc/min.)

Step 2—Core backflowed using 15% HCl. Flow rate=213 cc/2 min. (106.5 cc/min.).

Step 3—Core flowed with Morrow crude through in same direction as Step 1. Flow Rate=207 cc/15½ min. (13.35 cc/min.)

HYDROWATE fluid was mixed on a Hamilton Beach Mixer with Dayton 5 amp rheostat set on 10. The mixing procedure was as follows:

1. Measure out required amount of water.
2. While mixing, add required amount of dispersant then continue mixing one minute.
3. While mixing, slowly add required amount of weighting agent, then continue mixing two minutes.
4. While mixing, slowly add required amount of viscosifier and continue mixing 10 minutes.

5. While mixing, slowly add required amount of inhibitor and continue mixing three minutes.

A No. 2 spring was used in the Model 35 Fann VG Meter for recording the rheological properties and all the readings taken were doubled.

TABLE 9

| 13.0 ppg HYDROWATE Aqueous Fluid | |
|---|---|
| Fresh Water | 28.1 gal. |
| $CaCO_3$ Weighting Agent | 312 ppb |
| HEC Vicosifier | 3.0 ppb |
| KCl Inhibitor | 10.5 ppb |

| Sulfonate Dispersnt (ppb) | 0 | | 0.1 | | 0.2 | | 0.3 | |
|---|---|---|---|---|---|---|---|---|
| Temperature °F. | 72 | 160 | 72 | 160 | 72 | 160 | 72 | 160 |
| Apparent Viscosity | 110 | 50 | 94 | 44 | 99 | 37 | 87 | 33 |
| 600 Reading | 220 | 100 | 188 | 88 | 198 | 74 | 174 | 66 |
| 300 Reading | 135 | 66 | 110 | 54 | 114 | 44 | 97 | 37 |
| Plastic Viscosity | 85 | 34 | 78 | 34 | 84 | 30 | 77 | 29 |
| Yield Point | 50 | 32 | 32 | 20 | 30 | 14 | 20 | 8 |
| 200 Reading | 100 | 54 | 80 | 42 | 82 | 32 | 68 | 27 |
| 100 Reading | 60 | 39 | 46 | 28 | 48 | 20 | 37 | 16 |
| 6 Reading | 12 | 14 | 7 | 9 | 6 | 6 | 4 | 4 |
| 3 Reading | 9 | 13 | 5 | 8 | 4 | 4 | 3 | 3 |
| Gel Strength (10 sec.) | 10 | 18 | 6 | 9 | 6 | 6 | 4 | 5 |
| Gel Strength (10 min.) | 17 | 25 | 10 | 16 | 16 | 14 | 7 | 8 |
| API Fluid Loss (mls/30 min.) | 6.8 | — | 5.4 | — | 4.9 | — | 6.2 | — |

| 13.0 ppg | |
|---|---|
| Fresh Water | 28.1 gal. |
| Sulfonate Dispersant | 0.2 ppb |
| $CaCO_3$ Weight Agent | 312 ppb |
| KCl Inhibitor | 10.5 ppb |

| HEC Viscosifier | 2.0 | | 3.0 | | 3.5 | | 4.0 | | 4.5 | |
|---|---|---|---|---|---|---|---|---|---|---|
| Temperature °F. | 72 | 160 | 72 | 160 | 72 | 160 | 72 | 160 | 72 | 160 |
| Apparent Viscosity | 46.5 | 24 | 99 | 37 | 133 | 53 | 186 | 69 | 224 | 80 |
| 600 Reading | 93 | 48 | 198 | 74 | 266 | 106 | 372 | 138 | 448 | 160 |
| 300 Reading | 51 | 30 | 114 | 44 | 156 | 62 | 230 | 80 | 270 | 94 |
| Plastic Viscosity | 42 | 18 | 84 | 30 | 110 | 44 | 142 | 58 | 178 | 66 |
| Yield Point | 9 | 12 | 30 | 14 | 46 | 18 | 88 | 22 | 92 | 28 |
| 200 Reading | 36 | 24 | 82 | 32 | 114 | 46 | 170 | 60 | 202 | 70 |
| 100 Reading | 20 | 16 | 48 | 20 | 64 | 28 | 100 | 34 | 120 | 40 |
| 6 Reading | 3 | 6 | 6 | 6 | 8 | 6 | 12 | 8 | 14 | 8 |
| 3 Reading | 2 | 5 | 4 | 4 | 6 | 5 | 8 | 6 | 10 | 7 |
| Gel Strength (10 sec.) | 3 | 8 | 6 | 6 | 8 | 8 | 10 | 10 | 12 | 10 |
| Gel Strength (10 min.) | 7 | 13 | 16 | 14 | 16 | 16 | 16 | 18 | 20 | 17 |
| API Fluid Loss (mls/30 min.) | 7.1 | — | 4.9 | — | 4.9 | — | 4.7 | — | 4.3 | — |

TABLE 10

| 16.0 ppg | |
|---|---|
| Water | 19.2 gal. |
| Sulfonate Dispersant | 1.0 ppb |
| $CaCO_3$ Weighting Agent | 512 ppb |
| HEC Viscosifier | 0.5 ppb |
| KCl Inhibitor | 10.5 ppb |

| Sulfonate Dispersant (ppb) | 0.5 | | 1.0 | | 2.0 | | 2.5 | |
|---|---|---|---|---|---|---|---|---|
| Temperature °F. | 72 | 160 | 72 | 160 | 72 | 160 | 72 | 160 |
| Apparent Viscosity | 300+ | 117 | 300+ | 105 | 300+ | 102 | 300+ | 93 |
| 600 Reading | 600+ | 234 | 600+ | 210 | 600+ | 204 | 600+ | 186 |
| 300 Reading | 430 | 140 | 300 | 114 | 302 | 110 | 306 | 100 |
| Plastic Viscosity | — | 94 | — | 96 | — | 94 | — | 86 |
| Yield Point | — | 46 | — | 18 | — | 16 | — | 14 |
| 200 Reading | 306 | 96 | 190 | 80 | 200 | 76 | 198 | 70 |
| 100 Reading | 168 | 60 | 92 | 50 | 100 | 44 | 98 | 40 |
| 6 Reading | 36 | 20 | 18 | 16 | 16 | 14 | 16 | 14 |
| 3 Reading | 30 | 18 | 14 | 15 | 12 | 13 | 12 | 12 |
| Gel Strength (10 sec.) | 19 | 20 | 18 | 18 | 16 | 18 | 16 | 16 |
| Gel Strength (10 min.) | 40 | 34 | 30 | 38 | 30 | 32 | 32 | 24 |
| API Fluid Loss (mls/30 min.) | 11.8 | — | 10.4 | — | 7.6 | — | 7.0 | — |

| 16.0 ppg | |
|---|---|
| Water | 19.2 gal. |
| Sulfonate Dispersant | 2.5 ppb |
| $CaCO_3$ Weighting Agent | 512 ppb |
| HEC Viscosifier | 0.5 ppb |
| KCl Inhibitor | 10.2 ppb |

| Sulfonate Dispersant (ppb) | 0 | | 1.5 | | 2.0 | |
|---|---|---|---|---|---|---|
| Temperature °F. | 72 | 160 | 72 | 160 | 72 | 160 |

TABLE 10-continued

| | | | | | | |
|---|---|---|---|---|---|---|
| Apparent Viscosity | 300+ | 120 | 214 | 72 | 212 | 61 |
| 600 Reading | 600+ | 240 | 428 | 144 | 424 | 122 |
| 300 Reading | 600+ | 140 | 212 | 76 | 202 | 68 |
| Plastic Viscosity | — | 100 | 216 | 68 | 222 | 54 |
| Yield Point | — | 40 | — | 8 | — | 14 |
| 200 Reading | 600+ | 106 | 136 | 54 | 126 | 44 |
| 100 Reading | 422 | 72 | 68 | 36 | 58 | 25 |
| 6 Reading | 70 | 30 | 20 | 18 | 8 | 7 |
| 3 Reading | 48 | 22 | 18 | 16 | 6 | 6 |
| Gel Strength (10 sec.) | 102 | 26 | 28 | 18 | 8 | 9 |
| Gel Strength (10 min.) | 142 | 54 | 38 | 34 | 12 | 14 |
| API Fluid Loss (mls/30 min.) | NC* | — | 5.8 | — | 5.9 | — |

16.0 ppg

| | |
|---|---|
| Water | 19.2 gal. |
| Sulfonate Dispersant | 2.5 ppb |
| Oleyl Amide Dispersant | 1.0 ppb |
| CaCO₃ Weighting Agent | 512 ppb |
| KCl Inhibitor | 10.5 ppb |

| HEC Viscosifier (ppb) | 0.3 | | 0.4 | | 0.5 | | 0.6 | |
|---|---|---|---|---|---|---|---|---|
| Temperature °F. | 72 | 160 | 72 | 160 | 72 | 160 | 72 | 160 |
| Apparent Viscosity | 237 | 85 | 215 | 85 | 300+ | 93 | 300+ | 93 |
| 600 Reading | 474 | 170 | 430 | 170 | 600+ | 186 | 600+ | 186 |
| 300 Reading | 230 | 90 | 220 | 92 | 306 | 100 | 376 | 104 |
| Plastic Viscosity | 244 | 80 | 210 | 78 | — | 86 | — | 82 |
| Yield Point | 0 | 10 | 10 | 14 | — | 14 | — | 22 |
| 200 Reading | 152 | 64 | 150 | 64 | 198 | 70 | 254 | 74 |
| 100 Reading | 76 | 38 | 76 | 38 | 98 | 40 | 140 | 48 |
| 6 Reading | 14 | 14 | 12 | 14 | 16 | 14 | 36 | 20 |
| 3 Reading | 10 | 12 | 10 | 12 | 12 | 12 | 30 | 18 |
| Gel Strength (10 sec.) | 8 | 17 | 14 | 16 | 16 | 16 | 34 | 20 |
| Gel Strength (10 min.) | 36 | 42 | 34 | 38 | 32 | 24 | 54 | 16 |
| API Fluid Loss (mls/30 min.) | 9.0 | — | 9.4 | — | 7.0 | — | 5.4 | — |

*No Control

TABLE 11

Viscosities of HEC Polymers
Limits of Viscosity of Aqueous Solutions

| Polymer Type | Brookfield Viscosity at 25° C., cps at Varying Concentrations | | |
|---|---|---|---|
| | 1% | 2% | 5% |
| HH | 3,400–5,000 | — | — |
| H4 | 2,600–3,300 | — | — |
| H | 1,500–2,500 | — | — |
| MH | 1,000–1,500 | — | — |
| M | — | 4,500–6,500 | — |
| K | — | 1,500–2,500 | — |
| G | — | 150–400 | — |
| E | — | 25–105 | — |
| J | — | — | 150–400 |
| L | — | — | 75–150 |

I claim:

1. A method of preparing a high stability, high density fluid comprising adding in order with mixing to the volume of water calculated to produce the desired volume of high density fluid; a dispersant comprising a condensation product of naphthalene sulfonate and formaldehyde; a relatively inert water-insoluble finely divided particulate weighting agent having a mean particle size in the range of about 2–20 microns; a viscosifier comprising a hydratable substituted hydroxy alkyl cellulose polymer wherein the hydroxy alkyl substituents have 2–3 carbon atoms; and as an inhibitor which is present in an effective concentration to inhibit clay swelling at least one water soluble halide salt of alkali metal, alkaline earth metal or ammonium.

2. A method of claim 1 in which hydration of the viscosifier is retarded by maintaining the pH of the fluid below about 6.5 until all of the components have been added and mixed with the fluid.

3. A method of preparing a high density, high stability aqueous fluid of claim 1 wherein a second dispersant is added to the water before the viscosifier is added and after the weighting agent has been added, said second dispersant being a fatty acid amide-lignin liquor mixture, wherein the fatty acid precursor contains about 14–18 carbon atoms, the amine precursor is a low molecular weight amino sulfonic acid having 1–6 carbon atoms and the lignin is sulfonated.

* * * * *

UNITED STATES PATENT AND TRADEMARK OFFICE
CERTIFICATE OF CORRECTION

PATENT NO. : 4,217,229
DATED : August 12, 1980
INVENTOR(S) : Jimmie L. Watson

It is certified that error appears in the above-identified patent and that said Letters Patent are hereby corrected as shown below:

Columns 9 and 10, Table 1, line beginning "pH" under subheading "13.0", "81.0" should read --8.10--.

Columns 9 and 10, Table 1, line beginning "(mls/30 mn)" should read:
--4.3  4.0  5.4  4.4  4.7  5.5  5.2  3.8  5.7  5.3  7.4  5.1--.

Columns 9 and 10, Table 2, line beginning "Weighting Agent", should read:
--178  212  245  278  312  345  378  412  445  478  512  512--.

Columns 15 and 16, Table 9, first word in third line "$CaCO_{CO3}$" should read --$CaCO_3$--.

Signed and Sealed this

Eighteenth Day of November 1980

[SEAL]

Attest:

SIDNEY A. DIAMOND

Attesting Officer

Commissioner of Patents and Trademarks